United States Patent [19]

Jakobi

[11] 4,053,186
[45] Oct. 11, 1977

[54] PROPORTIONAL VALVE APPARATUS FOR USE IN A REAR BRAKE SYSTEM OF A VEHICLE

[75] Inventor: Dieter Jakobi, Brebach-Fechingen, Germany

[73] Assignee: The Bendix Corporation, South Bend, Ind.

[21] Appl. No.: 671,224

[22] Filed: Mar. 26, 1976

[30] Foreign Application Priority Data

June 4, 1975 Germany .............................. 2524842

[51] Int. Cl.² .......................... B60T 8/18; B60T 8/26
[52] U.S. Cl. .................................... 303/6 C; 188/349; 303/22 R
[58] Field of Search ................ 303/6 C, 6 R, 6 A, 22, 303/84; 188/349, 195, 345

[56] References Cited

U.S. PATENT DOCUMENTS

| 3,441,318 | 4/1969 | Bueler | 303/6 C |
| 3,738,709 | 6/1973 | Stokes | 303/6 C |
| 3,760,841 | 9/1973 | Daffron | 303/6 C X |
| 3,958,838 | 5/1976 | Totschnig | 303/6 C X |

FOREIGN PATENT DOCUMENTS

| 2,236,294 | 2/1974 | Germany | 303/6 C |

*Primary Examiner*—Trygve M. Blix
*Assistant Examiner*—Douglas C. Butler
*Attorney, Agent, or Firm*—Leo H. McCormick, Jr.; Ken C. Decker

[57] ABSTRACT

A proportioning device for controlling the distribution of fluid from separate pressurizing chambers in a master cylinder to corresponding first and second wheel brakes of a vehicle. The proportioning device is adapted to respond to changes in the pressure from the separate pressurizing chambers to assure that the fluid pressure supplied to the individual wheel brakes is substantially equal at all times.

8 Claims, 1 Drawing Figure

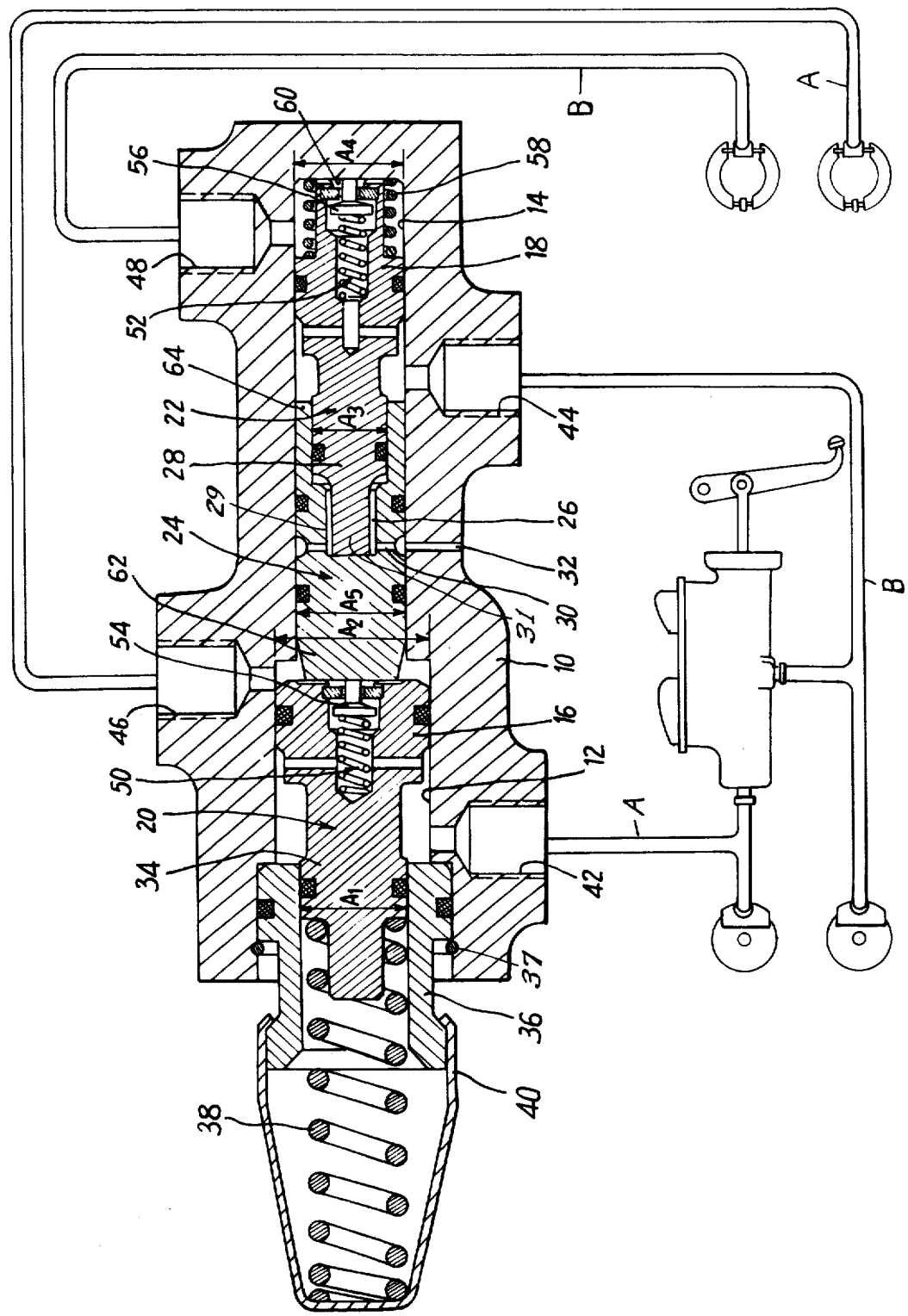

PROPORTIONAL VALVE APPARATUS FOR USE IN A REAR BRAKE SYSTEM OF A VEHICLE

BACKGROUND OF THE INVENTION

This invention relates to twin proportioning valves including two correcting valves notably adapted to be separately connected to two independent hydraulic braking sub-circuits of a vehicle each hydraulic valve being of the type comprising a movable differential piston. Such twin valves may be used particularly in diagonal brake circuits to control the rear axle braking forces.

There are known twin valves comprising two hydraulic proportioning valves, wherein the differential pistons are mounted in separate housings and are operatively connected to resilient return means by a mechanical linkage. This separate housing structure presents two main drawbacks : in effect manufacturing is rather expensive and the adjustment of the mechanical linkage in order to obtain substantially equal knee-point pressures is rather difficult and furthermore can only occur after mounting of the two valve housings on the vehicle. This last problem is critical when the twin valve is used in a diagonal circuit due to the fact the kneepoint pressures and the characteristic slopes of the proportioning valves should be the same.

SUMMARY OF THE INVENTION

The invention proposes a twin proportioning valve of simple structure and permitting an easy adjustment of the characteristics of the hydraulic circuits associated therewith, such adjustment being made in manufacture. No further adjustment is required after mounting on the vehicle except the usual one, which is necessary only when the twin valve is of the load sensing type.

BRIEF DESCRIPTION OF THE DRAWING

The preferred embodiment of invention is now described in reference to the sole FIGURE wherein a sectional view of a proportional valve made according to the invention and adapted to be used in a vehicle hydraulic diagonal braking circuit.

DETAILED DESCRIPTION OF THE PREFERRED EMBODIMENT

When considering the FIGURE a housing 10 is provided for retaining twin proportioning valves. The housing 10 is provided with a blind stepped bore having a larger diameter portion 12 and smaller diameter portion 14 in which are slidably mounted two correcting valves of the type including a differential piston. The differential pistons 20 and 22 are of the stepped type well known in conventional correcting valves and include rod and head portions of smaller and larger effective areas respectively. The head portions 16 and 18 of the differential pistons 20 and 22 are slidably mounted in tandem relationship within said stepped bore and separated by an intermediate piston 24 slidable within the smaller diameter piston 14. The ends 62 and 64 of pistons 24 have equal external diameters. The differential piston 22 which has its head portion adjacent to the closed end 60 of the stepped bore is hereinafter referred as the inner piston, whereas the other differential piston 20 is hereinafter referred as the outer piston. The end 64 of the intermediate piston 24 which is adjacent to the inner piston 22 is provided with a recess or blind stepped bore 29. End 31 of the rod portion 28 of the inner piston 22 extends into the blind stepped bore 29 to create a central chamber 26. The chamber 26 is operatively vented to the atmosphere through passages 30 and 32 provided in intermediate piston 24 and housing 10 respectively. A sleeve 36 is fixed to the housing 10 by a retainer ring 37. The rod portion 34 of the outer piston 20 projects outside of the housing 10 through the sleeve 36 and is engaged by resilient return means 38. The return means 38 consists of a spring, the free end of which abuts a spring retainer 40 secured to the sleeve 36. However, for some applications it may be desirable to connect the resilient return means 38 of the two correcting valves to an axle load sensing device through a lever arrangement to control the operation of the two correcting valves as a function of the load on the vehicle.

As usual in a proportioning valve, the housing 10 is provided with inlet ports 42 and 44 and outlet ports 46 and 48 adapted to be connected to two independent vehicle braking sub-circuits A and B. The inlet ports 42 and 44 for example are adapted to be connected to a tandem master-cylinder and the outlet ports 46 and 48 in case of a diagonal braking circuit to the brake actuators of the wheels located on either side of the rear axle of the vehicle. Furthermore, as shown on the drawing and as usual in proportioning valve technology, the differential pistons 20 and 22 are provided with seals and with passages in which are mounted spring-biased valve members 54, 56 adapted to sealingly cooperate with annular seats. Finally, a light spring 58 is mounted between the bore closed end 60 and the head 18.

The effective area A1 of the rod portion 34 of the outer piston 20 is equal to the effective area A5 of the end 62 of the intermediate piston 24. Also the differential piston ratios i.e. the ratio of the effective areas of the rod and head portions A1/A2 and A3/A4 respectively are substantially the same. While not compulsory for the operation of the device effective areas A4 and A5 are chosen preferably the same thereby simplify manufacturing of the device

Mode of Operation of The Invention

The twin proportioning valve is illustrated in brake release position wherein the return resilient means 38 biases the components of the device towards the right of the drawing in their rest position. More specifically the inner piston 22 abuts the closed end 60 of the stepped bore thereby opening the check-valve 56, the intermediate piston 24 abuts the rod portion 28 and finally the outer piston 20 abuts the adjacent end of the intermediate piston 24 thereby opening the check valve 54. Consequently, free fluid communication occurs between the inlet ports 42, 44 and their corresponding outlet ports 46 and 48.

During a full brake operation, assuming that both subcircuits A and B are in order, the increasing pressures at ports 42 and 44 are transmitted to ports 46 and 48. When the pressure over the rod area A1 develops a force more than the resistive load of the spring 38, the outer piston 34 moves to the left as shown in the drawing, while inner piston 22 moves under the influence of light spring 58 follows up and after a short travel valve member 56 engages its seat. There is now no direct connection between ports 44 and 48 and increasing pressure at port 44 works only on the annular area A4 - A3 so that the pressure at the outlet port 48 increases at a lower rate than that of the increasing pressure at port 44, as it occurs in usual proportioning valves. Due to differences of effective areas of the intermediate piston 24 the latter piston remains in contact with the rod portion 28 of the piston 22. Meanwhile outer piston 20 moves a little further and valve member 54 engages its seat. Once again the pressure in outlet port 46 will increase at a lesser rate than pressure at inlet port 42.

The knee-point in the characteristic curve is determined for sub-circuit B by a movement of piston 22 relative to the housing 10 of approximately 0.04 inch and for the circuit A by a movement of piston 20 relative to the housing of approximately 0.08 inch (0.04 + 0.04). Thus without adjustment after manufacture the pressures at the knee-points is substantially the same for both sub-circuits A and B and when not considering the preload of the light spring 58 are equal to the preload of spring 38 divided by area A1. The slope after the knee-point is determined for sub-circuit A by A2 -A1/A2 and for subcircuit B by A4 - A3/A4. As already stated these ratios are chosen to be equal.

When sub-circuit A fails and no pressures is developed in outlet port 46, the spring 38 must be overcome by pressure in inlet 44 acting on rod portion 28 of inner piston 22 and on the adjacent end 64 of the intermediate piston 24. To achieve the same knee-point in circuit B as before when both sub-circuits where intact the area A5 is chosen equal to the area A1.

When sub-circuit B fails pressure at the outlet 46 hold pistons 24 and 22 in their rest position against the force of light spring 58 and the pressure in the outlet port 46 is controlled exactly as before except that the knee-point is negligibly lower than with an intact device because the outer piston 20 is not followed by the intermediate piston and the check valve 54 therefore closes a little earlier.

One main advantage of the twin proportioning valve according to the invention is that the performance of each breaking sub-circuit A and B connected thereto remains substantially the same after the other sub-circuit has failed.

Assuming that the twin proportioning valve has a load sensing device connected to the resilient return means 38, the knee-point pressures is obtained by a single adjustment of the preload of the load sensing spring after mounting on the vehicle. However, thanks to the structure of this twin proportioning valve the equality of the knee-point pressure is obtained in both sub-circuits without adjustment after manufacture even if the valve is of the load sensing type.

This invention is not limited to a twin valve incorporating differential pistons of stepped type but also relates to differential pistons wherein the rod portion or the portion having the smaller effective area is of an annular shape. In another embodiment of the invention (not shown) the intermediate piston is stepped to define with the bore wall an annular vented recess in which projects the rod portion of an annular shape of the inner piston, the external diameter of which rod portion being equal to that of the end of the intermediate piston adjacent to the outer piston, the effective area of the latter end being equal to that of the rod portion of said outer piston. Shortly this structure is the converse of that hereinabove described and both devices operate in the same manner.

What I claim is:

1. A proportioning valve apparatus for use in diagonal brake circuits to control the brake forces supplied the rear brakes of a vehicle, said valve apparatus comprising:

a housing having a blind bore with a first diameter and a second diameter;

a first piston located in said first diameter of the bore having a first head portion and a first rod portion, said first rod portion having a smaller diameter than said first head portion, said head portion and the blind bore establishing a first output chamber, said first output chamber being connected to a first outlet port in said housing;

an intermediate piston located in said blind bore having a recess therein adjacent said first piston, said first rod portion extending into said recess to create a central chamber therein, said intermediate piston having a passage therein for connecting said central chamber to the atmosphere through a vent port in said housing, said first piston and intermediate piston establishing a first inlet chamber in the first diameter of said bore, said first inlet chamber being connected to a first source of fluid through a first inlet port in said housing, said first piston having a first passageway for connecting said first inlet chamber with said first outlet chamber;

a second piston located in said second diameter of the bore having a second head portion and a second rod portion, said second rod portion having a smaller diameter than said second head portion, said second head portion and said intermediate piston establishaing a second outlet chamber in said second diameter of the bore, said second outlet chamber being connected to a second outlet port in said housing, said second piston having a second passageway for connecting said second inlet port with said second outlet port;

retainer means connected to said housing and cooperating with said second rod of the second piston for sealing said bore to establish a second inlet chamber in said second diameter, said second inlet chamber being connected to a second source of fluid through a second inlet port in said housing;

first valve means located in said first passageway in the first piston for controlling communication of said first fluid between the first inlet port and the first outlet port;

second valve means located in said second passageway in the second piston for controlling communication of siad second fluid between the second inlet port and the second outlet port; and resilient means connected to said retainer means and engaging said second rod for urging said first and second pistons toward said first and second outlet chambers, respectively, to allow said first fluid free communication between said first inlet and outlets ports and said second fluid free communication between said second inlet and outlet ports, said first fluid acting on said first piston and said second fluid acting on said second piston to overcome said resilient means and move said first piston and said second piston toward said inlet chamber where said first and second valves thereafter control the communication of said first and second fluids.

2. the proportioning valve apparatus as recited in claim 1 further including:

a spring located in said first outlet chamber for urging said first piston into engagement with said intermediate piston to assure that said first and second piston move together in overcoming said resilient means.

3. The proportionining valve apparatus, as recited in claim 2 wherein the ratio of the diameter of the first head portion and first rod portion of the first piston and the second head portion and second rod portion of the second piston are equal and thereby allow actuation of the first and second valve means to assure simultaneous presentation of said first and second fluids to said first and second outlet ports.

4. Proportioning valve apparatus for a dual circuit brake system, said apparatus comprising:
a housing having a bore closed at one end;
a first movable proportioning piston slidably disposed in said bore having a head portion and a rod portion, said rod portion having an area in section smaller than that of said head portion;
a first output chamber established by the extremity of the head portion of the first piston and the closed end of the bore, said first output chamber being in communication with a first outlet port of the housing;
an intermediate piston being disposed in said bore;
said intermediate piston having a recess for receiving the rod portion of the first piston, said recess being vented to the atmosphere;
a first inlet chamber communicating with a first inlet portion of the housing being established by the intermediate piston and the head portion of the first piston;
a second movable porportioning piston slidably disposed in an enlarged diameter portion of said bore, said second movable porportioning piston having a head portion and a rod portion, the rod portion of the second movable porportioning piston having an area in cross section smaller than that of the second head portion;
a second output chamber established by the other end of the intermediate piston and the extremity of the head portion of the second piston in communication with a second outlet port of the housing;
closing means cooperating with the rod portion of the second piston for sealing said bore;
a second inlet chamber established by said closing means and the head portion of the second piston in communication with a second inlet port of the housing;
valve means located in each head portion of the first and second proportioning pistons for respectively controlling the fluid passage between the first and second inlet and outlet chambers;
first resilient means for urging said second piston toward said first piston; and
second resilient means having a load lower than said first resilient means being disposed between the closed end of the bore and the head portion of the first piston for urging said first rod portion into engagement with said intermediate piston to provide simultaneous movement of said first and second pistons in response to presentation of first and second fluids to said first and second inlet ports and thereby permit said valve means to simultaneously allows said first and second fluid to be communicated to said first and second outlet ports.

5. The proportioning valve apparatus according to claim 4, wherein said valve comprises:
a valve located in a passage in each of said first and second proportioning pistons for connecting the respective inlet and output chambers; and
a spring for urging each valve into sealing engagement with a seat, each valve being adapted to be unseated from the seat upon engagement upon movement of said first and second proportioning pistons.

6. The proportioning valve apparatus according to claim 4 wherein said intermediate piston includes:
a central blind stepped bore having a closed end; and
an exhaust passage being provided through said intermediate piston for connecting the closed end with a vent port in said housing.

7. The proportioning valve apparatus according to claim 4 wherein said intermediate piston includes:
a cylindrical body, the effective area of said cylindrical body of the intermediate piston being equal to that of the rod portion of said second piston.

8. The proportioning valve arrangement according to claim 4 wherein the ratio of the areas of the head and rod portion of the differential pistons are the same for both the first and second proportioning pistons.

* * * * *